July 8, 1958 P. A. FREEMAN 2,841,921
REMOTE CONTROL DEVICES
Filed March 2, 1956 2 Sheets-Sheet 1
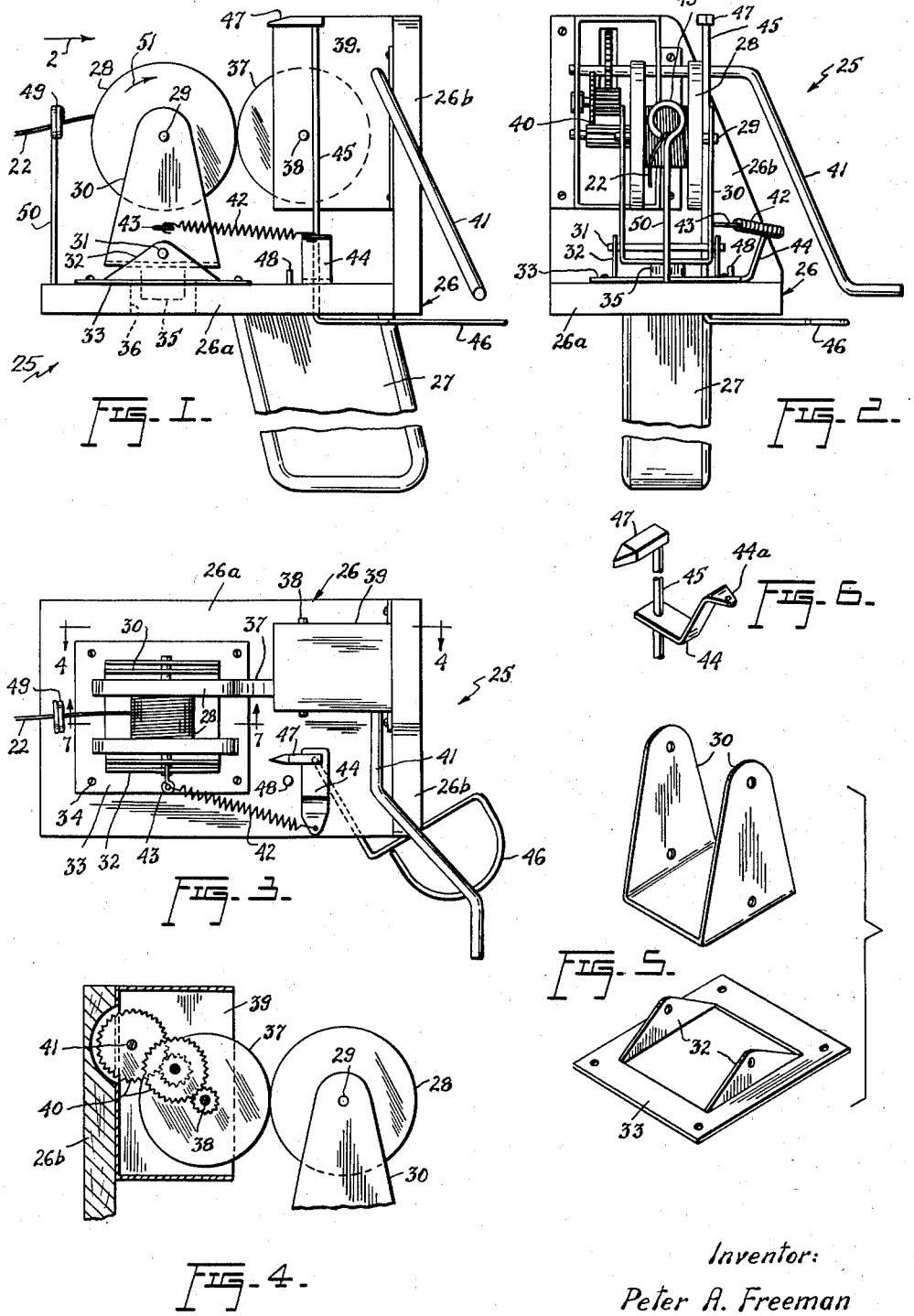
Inventor:
Peter A. Freeman July 8, 1958  P. A. FREEMAN  2,841,921
REMOTE CONTROL DEVICES
Filed March 2, 1956  2 Sheets-Sheet 2
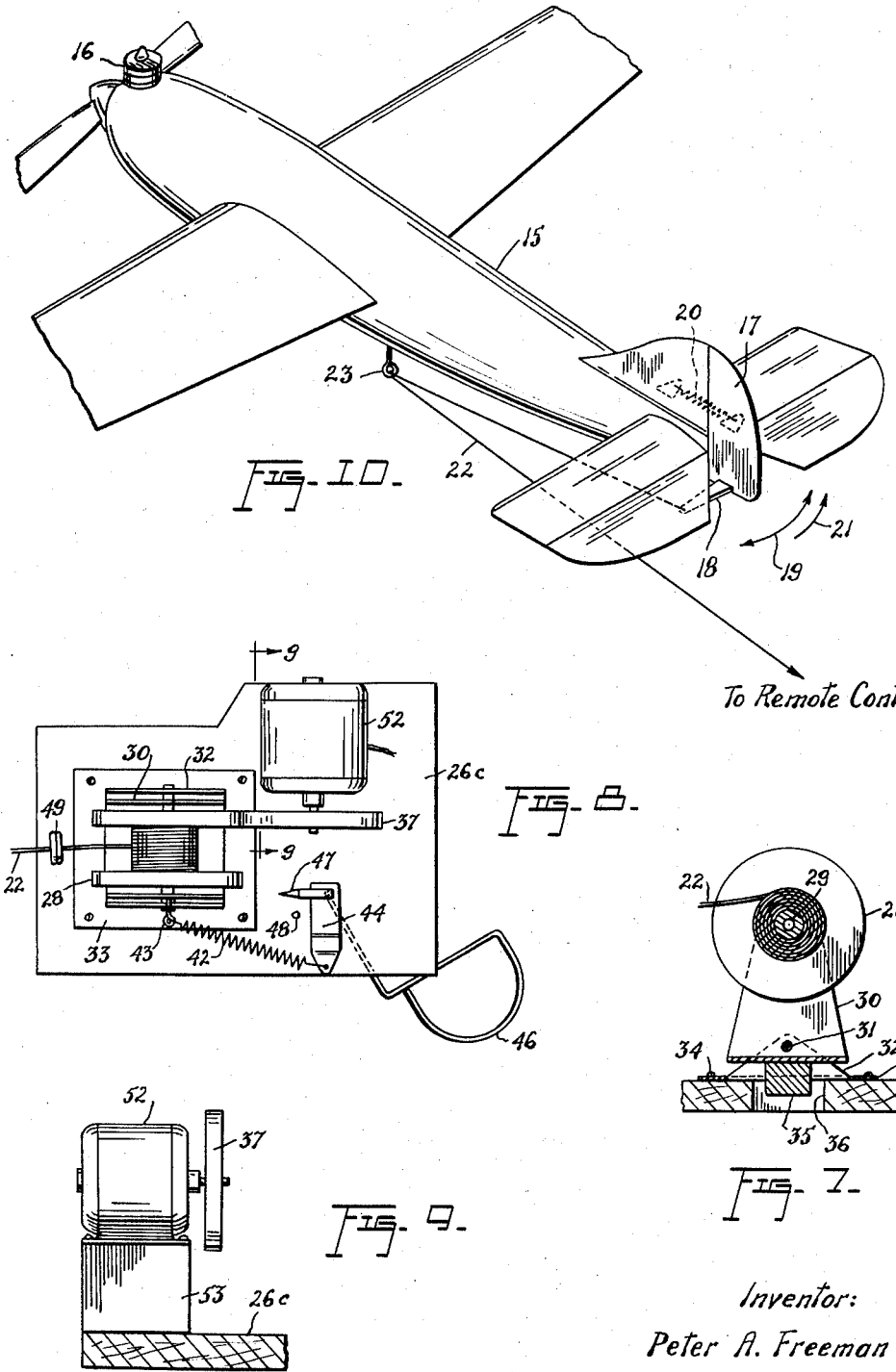
Inventor:
Peter A. Freeman United States Patent Office 2,841,921
Patented July 8, 1958

2,841,921

REMOTE CONTROL DEVICES

Peter A. Freeman, Baltimore, Md.

Application March 2, 1956, Serial No. 569,070

2 Claims. (Cl. 46—77)

This invention relates to new and useful improvements and structural refinements in remote control devices for self-propelled conveyances such as ground vehicles, aircraft, missiles, marine vessels, underwater craft, and the like. In particular, the invention concerns itself with the remote control of model aircraft, model boats and model automobiles, although it is to be understood that the principles of the invention are equally well adaptable to full size prototypes.

Remote control of self-propelled conveyances such as the above has always presented certain problems. For example, in the instance of a model airplane equipped with its own power plant, the control of steering could not be effected from the ground unless the airplane were made captive by connecting it with one or more control lines to the operator on the ground. As a result of this captive arrangement, the airplane could fly only in a circle or a hemi-sphere, with the operator at the center thereof.

Efforts to eliminate this obvious disadvantage resulted in the use of a remote radio control, but here also such apparatus presented many problems. For example, the radio control was very costly and complicated, and the weight of its equipment unduly hampered the performance of the airplane. Moreover, operation of such a control could not be undertaken without proper instruction and license by the Federal Communications Commission.

It is, therefore, the principal object of the instant invention to eliminate the disadvantages resulting from the use of conventional remote control equipment, this being achieved by the provision of a simple, mechanical control device which does not restrict the operation of the conveyance to a circular path or a hemi-spherical orbit, but which effectively permits it to travel freely—in a straight line, if desired—within limits imposed only by a line of substantial length windable on and off a freely rotatable drum which the control embodies in its construction.

Briefly stated, the invention comprises a remote control device adapted for use in conjunction with a self-propelled conveyance having a control element movable between opposite limits and urged by a suitable biasing means in the direction of one of those limits, the control device embodying a flexible line connected to such a control element on the conveyance and being wound upon a rotatable drum so that it may be automatically unwound therefrom as the distance between the control device and the conveyance increases with the travelling movement of the latter. The control device also embodies a rotating drive member and a variable friction drive between the drive member and the drum, so that by actuating the friction drive to produce the required amount of friction, there is produced a tendency for the drum to rotate—or actual rotation thereof—to either maintain the connecting line under normal tension or exert a pull on the line to move the control element on the conveyance in a direction opposite to that in which it is biased.

Other advantages and features of the invention may become apparent from the following description taken in conjunction with the accompanying drawings, wherein like characters of reference are employed to designate like parts and wherein:

Figure 1 is a side elevational view of a remote control device in accordance with the invention;

Figure 2 is a front end view thereof, taken in the direction of the arrow 2 in Figure 1;

Figure 3 is a top plan view of the same;

Figure 4 is a fragmentary sectional view, taken substantially in the plane of the line 4—4 in Figure 3;

Figure 5 is a group perspective view of the mounting plate and yoke for the drum used in the invention;

Figure 6 is a fragmentary perspective view of a crank and indicator used therein;

Figure 7 is a fragmentary sectional view taken substantially in the plane of the line 7—7 in Figure 3;

Figure 8 is a top plan view showing a modified form of the invention using a motor drive in place of a hand drive;

Figure 9 is a fragmentary sectional view, taken substantially in the plane of the line 9—9 in Figure 8; and Figure 10 is a fragmentary perspective view of a model airplane, showing the control element thereof connected to the line of the remote control.

Referring now to the accompanying drawings in detail, Figure 10 illustrates a model airplane 15 equipped with its own power plant 16 and provided with the usual rudder 17 for steering purposes. A control element in the form of a crank or lever 18 is secured to the rudder 17 and both the rudder and the element 18 are movable together between opposite limits, as indicated by the arrow 19.

Moreover, suitable biasing means such as a tension spring 20 extends between the rudder 17 and a relatively stationary part of the airplane so as to urge the rudder to one side, such as for example, in the direction of the arrow 21. A flexible line or cord 22 is connected at one end thereof to the control element 18 and, after passing through an eye-shaped guide 23 at the underside of the airplane, proceeds to the remote control device now to be described.

The remote control device in accordance with the invention is designated generally by the reference numeral 25 and embodies in its construction a suitable frame 26 including a base plate 26a provided at one end thereof with an upstanding portion 26b. A suitable hand grip 27 is secured to the underside of the base plate 26a whereby the entire device may be conveniently held in one hand.

The aforementioned line or cord 22 is wound upon a freely rotatable drum 28, supported on a shaft 29 between the sides of a U-shaped yoke 30. The yoke 30 itself is rockably mounted upon a shaft 31 extending between a pair of upstanding ears 32 struck out from a mounting plate 33 which, in turn, is secured to the base plate 26a by a plurality of nails or screws 34. A suitable weight 35 is secured to the underside of the yoke 30 to urge the latter to an upright position, it being noted that this weight is disposed in the space formed in the plate 33 by the striking out of the ears 32, and that the base plate 26a is also recessed as shown at 36 so as to afford clearance for the weight during rocking of the yoke 30 on the shaft 31.

Means are provided for rotating the drum 28, these means comprising a rotatable drive member in the form of a disc 37 which is secured to a shaft 38 of a gear box 39 mounted on the frame portion 26b. The shaft 38 is operatively connected by a step-up gearing 40 to a hand crank 41 which projects outwardly from the gear box 39 and is turned by hand for imparting rapid rotation to the disc 37.

The periphery of the disc 37 is frictionally engageable with the periphery of one of the side flanges of the drum 28, this frictional engagement being produced by a tension spring 42 which is anchored at one end thereof to an eye 43 on one side of the yoke 30, while the other end of the spring 42 is connected to an apertured free end portion 44a of a crank 44.

The crank 44 is secured to a vertical rod or shaft 45 which is rotatable in the base plate 26a and has an angulated lower end portion forming a finger-piece 46 disposed adjacent the hand crank 41. The upper end of the shaft 45 is provided with an indicator or pointer 47, the purpose of which will be hereinafter more fully described. A stop pin 48 projects upwardly from the base plate 26a to limit the movement of the crank 44 toward the yoke 30 under the action of the spring 42.

Finally, it will be noted that after leaving the drum 28, the line 22 passes through an eye-shaped guide 49 at the upper end of a rod 50 supported by the plate 26a.

Having thus described the construction of the invention, its operation will now be explained.

With the remote control device inactive, the spring 20 on the airplane 15 will urge the rudder 17 to one side, in the direction of the arrow 21, in which position the rudder will cause the airplane to execute a turn to the starboard. However, when the remote control device is actuated by holding the same in one hand by the hand grip 27 and rotating the crank 41 with the other hand, the thumb of the hand holding the grip 27 is inserted in the finger piece 46 and the latter is moved to a position wherein the indicator 47 is disposed centrally, that is, substantially parallel to the plane of the disc 37 as shown in Figure 3.

This positioning of the finger-piece 46 will rotate the rod 45 and the crank 44 to such extent that the spring 42 will be tensioned sufficiently to rock the yoke 30 and bring the drum 28 into frictional engagement with the disc 37 with sufficient pressure to produce partial rotation of the drum 28 in the direction of the arrow 51, thereby exerting a pull on the line 22. This pull, in turn, will be transmitted to the control element 18 on the airplane and the rudder 17 will be moved to the straightahead position against the action of the spring 20. The relative strengths of the springs 20, 42 are such that as long as the finger-piece 46 is held with the indicator 47 in the "central" position, the friction drive from the disc 37 to the drum 28 will be just sufficient to produce a tendency of the drum to rotate and hold the rudder 17 in its central position through tensioning of the line 22.

When it is desired to fly the airplane to the starboard, the finger-piece 46 is actuated so that the indicator 47 is turned to the starboard. As a resut, the tension of the spring 42 is decreased and the efficiency of the friction drive between the disc 37 and the drum 28 is decreased accordingly. In such event the drum 28 may rotate in a direction opposite to that shown by the arrow 51, the pull on the line 22 is relaxed and the rudder 17 is moved to the starboard by the action of the spring 20.

Conversely, when it is desired to execute a turn to the port side, the finger-piece 46 is moved so that the indicator 47 is turned to port, thereby increasing the tension of the spring 42. As a result, the efficiency of the friction drive to the drum 28 is increased accordingly, and the drum is rotated in the direction of the arrow 51 to place a pull on the line 22 of such intensity as to swing the rudder 17 to the port side against the action of the spring 20.

It is to be particularly noted that the control procedure as above described is maintained constantly while the airplane is in flight and irrespective of the change of distance of the airplane from the remote control device.

In other words, when the distance of the airplane from the control device increases, the line 22 is freely unwound from the drum 28 by the movement of the airplane and the resultant rotation of the drum 28 is wholly independent of its rotation, if any, imparted to it by the friction drive the control.

By the same token, rotation of the drum under the action of the friction drive is independent of the rotation produced by the "pull" of the airplane during flight, and drum rotation under the two different kinds of actuations may take place simultaneously or each alone, depending on the movement of the airplane and/or the control imparted to it by the control device.

When the airplane is flying toward the control device and the distance therebetween is progressively decreased, the tendency of the drum 28 to rotate in the direction of the arrow 51—as produced by the friction drive—will cause the line 22 to wind itself upon the drum, also quite independently of the control imparted through the line to the airplane.

It will be observed that with little practice, the airplane can be flown with accurate directional control, or in a straight line as desired, the only limit imposed upon its span of operation being the length of the line 22 which, of course, may be considerable.

In the somewhat modified form of the invention shown in Figures 8 and 9, the hand crank 41 for imparting rotation to the drive disc 37 is eliminated and the drive disc is secured directly to the armature shaft of a suitable electric motor 52 mounted on a block 53 on the base plate 26c. Other components of this form of the invention are substantially the same as already described.

It is to be noted that apart from controlling direction of travel, the device may also be effectively employed for controlling other phases of operation, such as for example, ailerons, elevators, engine speed, and the like. Moreover, while for illustrative purposes the device has been described in conjunction with an airplane, it may be used equally well with model boats, automobiles, and any other similar self-propelled conveyances, wherever remote control is desired.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. The combination of a self-propelled conveyance including a control element movable between opposite limits and biasing means urging said element in the direction of one of said limits, and a remote control device comprising a freely rotatable drum, a flexible line wound on said drum and connected at its outer end to said control element whereby said conveyance is free to move toward and away from said control device during winding and unwinding of said line on said drum, a rotatable drive member frictionally connected to the drum, means for rotating said drive member, and means for selectively varying the friction of the connection between said drive member and the drum whereby a pull may be exerted on said line to move said control element in a direction opposite to that in which it is urged by said biasing means.

2. A remote control device for self-propelled conveyances having a control element movable between opposite limits and biased in the direction of one of said limits, said remote control device comprising a frame, a drive disc rotatably mounted on said frame, means for rotating said drive disc, a yoke movable on said frame toward and away from the drive disc, a freely rotatable drum mounted in said yoke and in frictional driving engagement with said disc, a flexible line wound on said drum and adapted at its outer end for connection to the control element of a conveyance, and means for selectively varying the frictional drive between said drum and said disc, said last mentioned means including a tension spring connected at one end thereof to said yoke and urging the same toward said disc, a crank pivoted to frame and having the other end of said spring connected thereto, and a finger-piece connected to said crank for actuating the same.

References Cited in the file of this patent

UNITED STATES PATENTS

| | | |
|---|---|---|
| 1,083,294 | Parham | Jan. 6, 1914 |
| 2,223,445 | Doble | Dec. 3, 1940 |
| 2,288,350 | Gollwitzer | June 30, 1942 |
| 2,404,922 | Pedgett | July 30, 1946 |
| 2,406,874 | Walker | Sept. 3, 1946 |
| 2,537,260 | Dale | Jan. 9, 1951 |
| 2,559,049 | St. Clair | July 3, 1951 |
| 2,655,075 | Lightburn et al. | Oct. 13, 1953 |
| 2,658,305 | Hayes | Nov. 10, 1953 |
| 2,683,917 | Furst | July 20, 1954 |

FOREIGN PATENTS

| | | |
|---|---|---|
| 1,081,670 | France | June 9, 1954 |